United States Patent

Burdick

[15] 3,650,044

[45] Mar. 21, 1972

[54] TEACHING DEVICE

[72] Inventor: Donald R. Burdick, Fairfield, Ohio

[73] Assignee: Donald H. Pater, Village of Green Hills, Ohio a part interest

[22] Filed: Sept. 22, 1970

[21] Appl. No.: 74,404

[52] U.S. Cl. ............................................................35/9 C
[51] Int. Cl. .........................................................G09b 7/06
[58] Field of Search....................................35/9 B, 9 C, 19 A

[56] References Cited

UNITED STATES PATENTS

| 3,057,082 | 10/1962 | Wellington et al. | 35/9 C |
| 2,144,216 | 1/1939 | Broome | 35/19 A |
| 3,190,014 | 6/1965 | Rhodes | 35/9 B X |

OTHER PUBLICATIONS

Stansi Scientific Div. Catalog; pages 250, 294; (Nos. 42242, 42245– Solar Cell and Motor, Solar Battery; No. 44205 Galvanometer) Q185.F54

Primary Examiner—Wm. H. Grieb
Attorney—Pearce & Schaeperklaus

[57] ABSTRACT

A teaching device which is powered by an exposed light sensitive cell. A galvanometer, a question and answer display, and pupil operated means for indicating a selected answer in the display are connected to the cell, and when a predetermined answer is selected by the pupil and light is being received by the cell, the galvanometer is energized.

6 Claims, 7 Drawing Figures

PATENTED MAR 21 1972 3,650,044

INVENTOR.
DONALD R. BURDICK

BY Pearce & Scheefenkleins

ATTORNEYS.

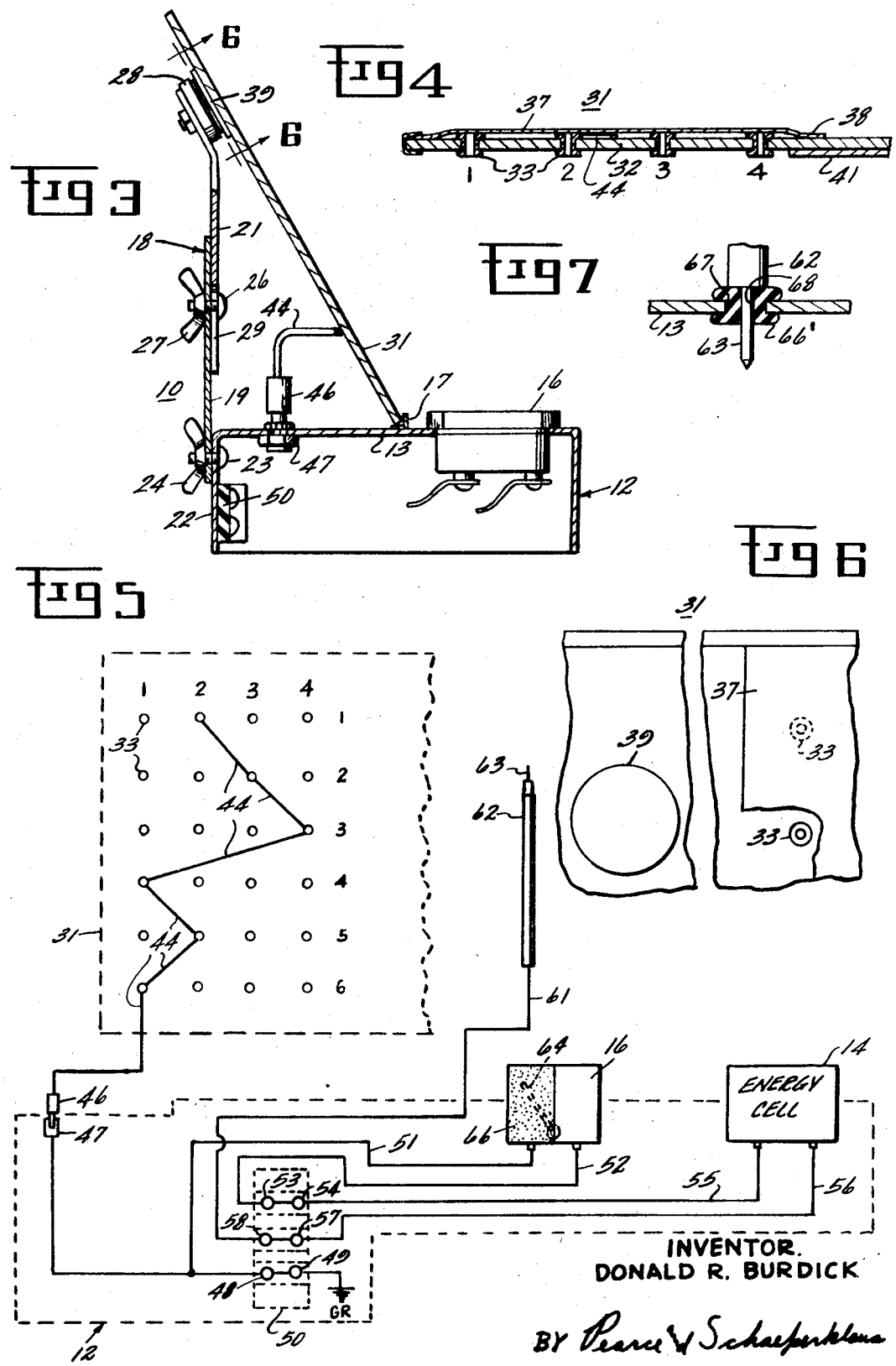

TEACHING DEVICE

This invention relates to a teaching device.

An object of this invention is to provide a teaching device which is self-contained and requires no wire connections or the like to power outlets and no replaceable batteries or the like.

Briefly, this invention provides a teaching device in which power for operating the teaching device is supplied by a light sensitive cell which produces an electric potential when light is received thereby. The light is supplied by light fixtures such as fluorescent light fixtures in a class room. A galvanometer is connected to the cell through a circuit which also includes circuits in a question card so that when a student records a correct response to a question on the question card, the galvanometer is energized.

The above and other objects and features of the invention will be apparent to those skilled in the art to which this invention pertains from the following detailed description and the drawings, in which:

FIG. 3 is a view in section taken on the line 3—3 in FIG. 1;

FIG. 4 is a view in section taken on the line 4—4 in FIG. 1;

FIG. 5 is a schematic wiring diagram of the teaching machine;

FIG. 6 is a fragmentary view in section taken on the line 6—6 in FIG. 3; and

FIG. 7 is a fragmentary view in section taken on the line 7—7 in FIG. 2.

In the following detailed description and the drawings, like reference characters indicate like parts.

Figure 1:
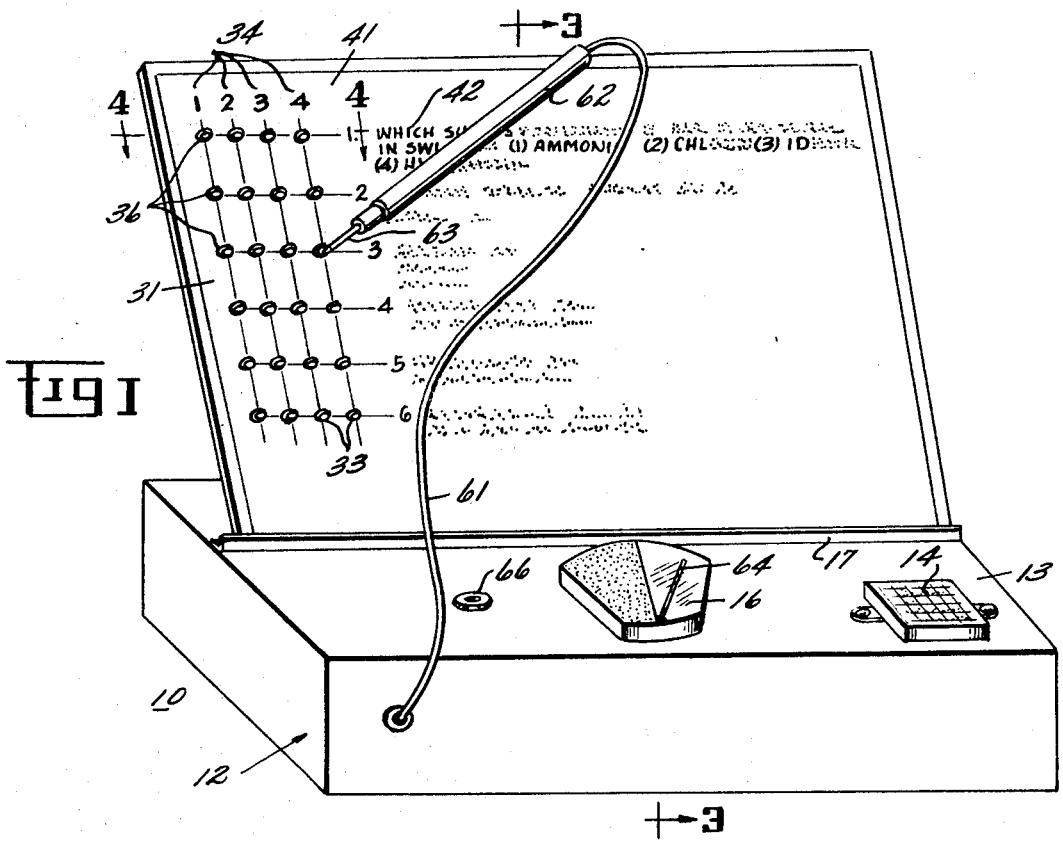
FIG. 1 is a perspective view of a teaching machine constructed in accordance with an embodiment of this invention, a question display board being shown in association therewith.
Figure 2:
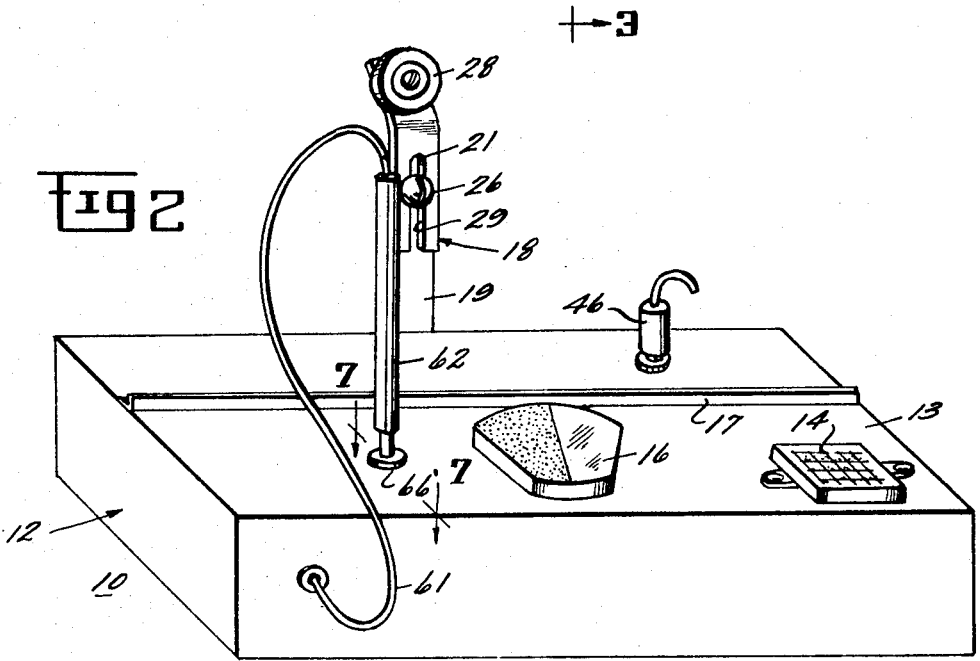
FIG. 2 is a perspective view of the machine shown in FIG. 1 with the question display board removed.

In FIGS. 1 and 2 is shown a teaching device 10 which is constructed in accordance with an embodiment of this invention. The teaching device 10 includes an inverted boxlike frame 12 which includes an upper panel 13 on which is mounted a light energized cell 14, which can be of the type known as a "solar battery" and supplies an electric potential when exposed to light. A galvanometer 16 is also mounted on the panel 13. In addition, a card supporting angle member 17 is mounted on the panel 13 behind the cell 14 and the galvanometer 16. A card supporting assembly 18 (FIGS. 2 and 3) consisting of a lower bar member 19 and an upper bar member 21 is supported on a back panel 22 of the frame 12. A lower end of the lower member 19 is supported on the back panel 22 (FIG. 3) by means of a bolt 23 and a wing nut 24 (FIG. 3). The upper member 21 is attached to the lower member 19 by means of a bolt 26 and a wing nut 27. A permanent magnet 28 is attached to an upper end of the upper bar member 21. The bolt 26 extends through a slot 29 (FIG. 2) in the upper member 21 so that the height of the magnet 28 can be adjusted.

A question display card 31 is shown in FIGS. 1, 3 and 4. The card 31 includes a body 32 (FIG. 4) which can be of any appropriate substantially rigid dielectric sheet material such as cardboard or the like. A plurality of metal rivets 33 is mounted in the card body, the rivets being arranged in columns 34 (FIG. 1) and rows 36. The rivets 33 form contacts which are exposed at a front of the card. A sheet of dielectric material 37 (FIG. 4) covers the rear faces of the rivets and also covers wiring of the card which will be described in detail hereinafter. The dielectric sheet 37 can have a pressure sensitive adhesive coating on edge portions thereof so that the edge portions can be attached to the rear face of the card body, as indicated at 38 in FIG. 4. A disc 39 (FIGS. 3 and 6) of magnetically responsive material, such as iron, is adhesively attached to the rear face of the card body. The card can be mounted on the device with a lower edge of the card resting against the angle member 17 as shown in FIG. 3 and with the magnet 28 engaging the disc 39 to hold the card in place. A sheet of paper or the like 41 (FIGS. 1 and 4) is adhesively attached to the front face of the card body 32. The sheet 41 carries appropriate questions and alternate answers 42 (FIG. 1) which are aligned with the rows of rivets 36.

As shown in FIG. 5, one of the rivet contacts of each row, which represents a correct answer to the question aligned with the row, is attached to one of a group of leads 44. The leads 44 are connected to a plug 46 which is removably received in a socket 47. The socket 47 is connected through contacts 48–49 of a contact board 50 to ground. A lead 51 connects one side of the galvanometer 16 to ground. The other side of the galvanometer 16 is connected through a lead 52, contacts 53–54 of the contact board 50, and a lead 55 to one side of the cell 14. The other side of the cell 14 is connected through a lead 56, contacts 57–58 of the contact board 50, and a lead 61 to a stylus or probe 62. When a contact tip 63 of the probe 62 is brought into engagement with one of the rivet contacts 33 which is attached to one of the leads 44 while the cell 14 is exposed to light, the cell 14 energizes the galvanometer 16 and an indicator or pointer 64 of the galvanometer 16 swings from the position shown in FIG. 5 to that shown in FIG. 1. One-half of the face of the galvanometer 16 can be darkened as indicated by stippling 66 in FIG. 5 so that the pointer 64 of the galvanometer 16 can be seen only when the galvanometer is energized, i.e., when a rivet contact for a correct answer is engaged by the probe 62 and the cell 14 is receiving light.

When the stylus is not in use, it can be mounted in a grommet 66', as shown in FIG. 2. The grommet 66' is mounted in an opening 67 in the panel 13 and is formed of dielectric material such as rubber or the like. A central opening 68 of the grommet 66' can receive the contact tip 63 of the stylus.

When the teaching device is to be used, it is placed in a position where the cell 14 is exposed to strong illumination, as from fluorescent lighting fixtures (not shown) in a class room. The card 31 is mounted on the device, and the plug 46 is mounted in the socket 47 (FIG. 3). Then a pupil selects a proper answer to a question and brings the contact tip 63 (FIG. 1) of the stylus into engagement with one of the rivets 33 representing the correct answer, and the circuitry causes the galvanometer 16 to be energized so that the pointer 64 swings to the FIG. 1 position showing selection of the correct answer.

The teaching device illustrated in the drawings and described above is self-contained and requires no connections to power outlets and no replaceable batteries or the like. The teaching device is subject to structural modification without departing from the spirit and scope of the appended claims.

What I claim as new and desire to secure by letters patent is:

1. A teaching device which comprises an exposed light sensitive cell, a galvanometer, a question and answer display, pupil operated means for indicating a selected answer in the display, and electric circuitry connecting the cell, the galvanometer, the display, and the pupil operated means so that when a predetermined answer is selected and light is being received by the cell, the galvanometer is energized.

2. A teaching device as in claim 1 wherein the display includes a card provided with a plurality of contacts representing selected answers to questions, the circuitry includes means connected to selected contacts representing selected answers to questions, and the pupil operated means includes a probe connected to the circuitry and engageable with the selected contacts to complete a circuit to energize the galvanometer when the probe is in engagement with one of the selected contacts.

3. A teaching device as in claim 1 which includes a case and in which the cell is mounted on an upper face of the case in position to receive light from above.

4. A teaching device as in claim 3 wherein means is provided on the case for supporting the question and answer display.

5. A teaching device as in claim 4 wherein the display is a rigid card and the means for supporting the display includes a rest on the upper face of the case for engaging a lower edge of the display card and an upright member above and behind the rest and engageable by the display card when supported on the rest.

6. A teaching device as in claim 5 wherein magnetically cooperating elements are mounted on the display card and on the upright member, the elements cooperating to hold the card in position on the case.

* * * * *